No. 688,698. Patented Dec. 10, 1901.
P. RUPP.
VALVE AND INFLATER CONNECTION FOR PNEUMATIC TIRES, &c.
(Application filed Apr. 8, 1901.)
(No Model.)

UNITED STATES PATENT OFFICE.

PHILIPP RUPP, OF ELLWANGEN, GERMANY, ASSIGNOR TO CARL BRIEGER, OF HAMBURG, GERMANY.

VALVE AND INFLATER CONNECTION FOR PNEUMATIC TIRES, &c.

SPECIFICATION forming part of Letters Patent No. 688,698, dated December 10, 1901.

Application filed April 8, 1901. Serial No. 54,913. (No model.)

*To all whom it may concern:*

Be it known that I, PHILIPP RUPP, a subject of the King of Würtemberg, residing at Ellwangen, in the Kingdom of Würtemberg, Germany, have invented certain new and useful Improvements in and Relating to Valve and Inflater Connections for Pneumatic Tires and the Like, of which the following is a specification.

The present invention relates to a coupling for connecting the inflater or air-pump tube to the valve-stem of the air-tube of a pneumatic tire or to other inflatable article; and its characteristic feature consists in that the connecting-piece is composed of a simple sleeve which is formed with an internal screw-thread and which is slit along a portion of its length, whereby separate elastic parts are formed which are slipped over the externally-screw-threaded valve-stem and are pressed together by means of a sliding sleeve that is capable of movement along the connecting-piece, so that an easily-disconnectible and yet close connection is produced.

Figure 1:
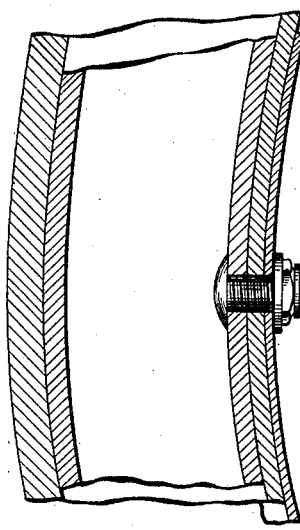
Figure 1:
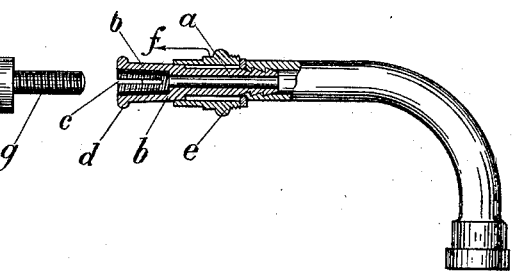
Figure 2:
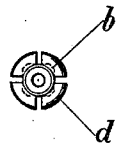
Figure 3:
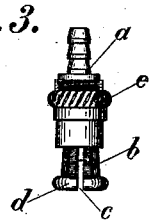

In the accompanying drawings, which illustrate the invention, Figure 1 is a view in side elevation, partly in section. Fig. 2 is an end view of the coupling. Fig. 3 is a side view of the same.

The connecting-piece on the air-pump tube consists of a simple sleeve $a$, which is slit for a portion of its length, whereby separate elastic parts $b$ are formed. These separate parts are formed with an internal screw-thread $c$ and with an external bead or lip $d$ at the end. The internal screw-thread $c$ is adapted to engage the external screw-thread $g$ of the valve-stem, fixed in customary manner to the air-tube or the like. A sliding sleeve $e$ is arranged on the outside of the threaded sleeve $a$, so as to be capable of moving along the same and so that when it is moved it will press together the elastic ends $b$ of the threaded sleeve $a$. When it is desired to make the connection, the sliding sleeve $e$ having been first drawn back the threaded sleeve $a$ is simply pressed upon the end of the screw-thread $g$, and the sliding sleeve $e$ is pushed forward in the direction of the arrow $f$, whereupon a firm and yet readily-disconnectible connection is made, because the sliding sleeve $e$ closes the joint while compressing the elastic ends $b$ of the screw-sleeve $a$. Further, the sleeve members $b$ are formed with flat surfaces on both sides, as shown in Fig. 3 and in dotted lines in Fig. 2, on which surfaces the interior of the sliding sleeve $e$ fits at these places, so that the sleeve $e$ can be slid easily to and fro and may also be used to impart a slight rotation to the coupling-sleeve $d$ after it is clamped on the screw $g$, so as to tighten the joint. When the connection is to be undone, it is merely necessary to draw back the sleeve $e$, and then the connecting-piece of the inflater or pump-tube becomes automatically disconnected from the valve-stem.

What I claim, and desire to secure by Letters Patent of the United States, is—

1. The combination of the sleeve $a$, having an internal screw-thread $c$, and split longitudinally from its end so as to form elastic arms $b$; the externally-threaded stem $g$ over which the internally-threaded arms $b$ fit; and the external sleeve $e$, sliding on the sleeve $a$ and serving to press the threaded arms $b$ together, into engagement with the threaded stem $g$, as explained.

2. The combination of the threaded stem $g$, the internally-threaded coupling-sleeve $d$, formed with separate elastic arms $b$ having flat external surfaces and an external sleeve $e$ fitting and sliding on the divided screw-sleeve $a$ so as to compress the elastic arms thereof on the stem $g$ or impart rotation to said sleeve $a$ when required.

In testimony whereof I have hereunto set my hand in the presence of two witnesses.

PHILIPP RUPP.

Witnesses:
 MARTIN BRONNER,
 WM. HAHN.